United States Patent

[11] 3,561,800

| [72] | Inventor | Morris Hassan<br>Trenton, Mich. |
|---|---|---|
| [21] | Appl. No. | 878,735 |
| [22] | Filed | Nov. 21, 1969 |
| [45] | Patented | Feb. 9, 1971 |
| [73] | Assignee | Chrysler Corporation<br>Highland Park, Mich.<br>a corporation of Delaware |

[54] PRELOADED BALL JOINT
5 Claims, 3 Drawing Figs.

[52] U.S. Cl. ........................... 287/87,
308/72
[51] Int. Cl. ........................... F16c 11/06
[50] Field of Search........................... 287/87,
90A, 90C, 85A; 308/72; 29/149.5B, 149.5NM;
264/242, 130, (Cursory)

[56] References Cited
UNITED STATES PATENTS

| 2,928,687 | 3/1960 | Latzen........................... | 287/90C |
| 3,164,389 | 1/1965 | Thomas........................... | 287/90A |
| 3,384,396 | 5/1968 | Hamilton........................... | 287/87 |

Primary Examiner—David J. Williamowsky
Assistant Examiner—Andrew V. Kundrat
Attorney—Harness, Talburtt and Baldwin ABSTRACT: A ball joint incorporating means for insuring a proper joint preload throughout the life of the joint. The preloading is accomplished by injecting plastic into a portion of the joint at a pressure sufficient to firmly press the joint components together. The plastic becomes an integral part of the joint and distributes substantially uniform pressure across the joint components. Due to its location in the joint, the plastic is not in contact with the components of the joint which move, and hence, the degree of preload is not effected through wear of the plastic.

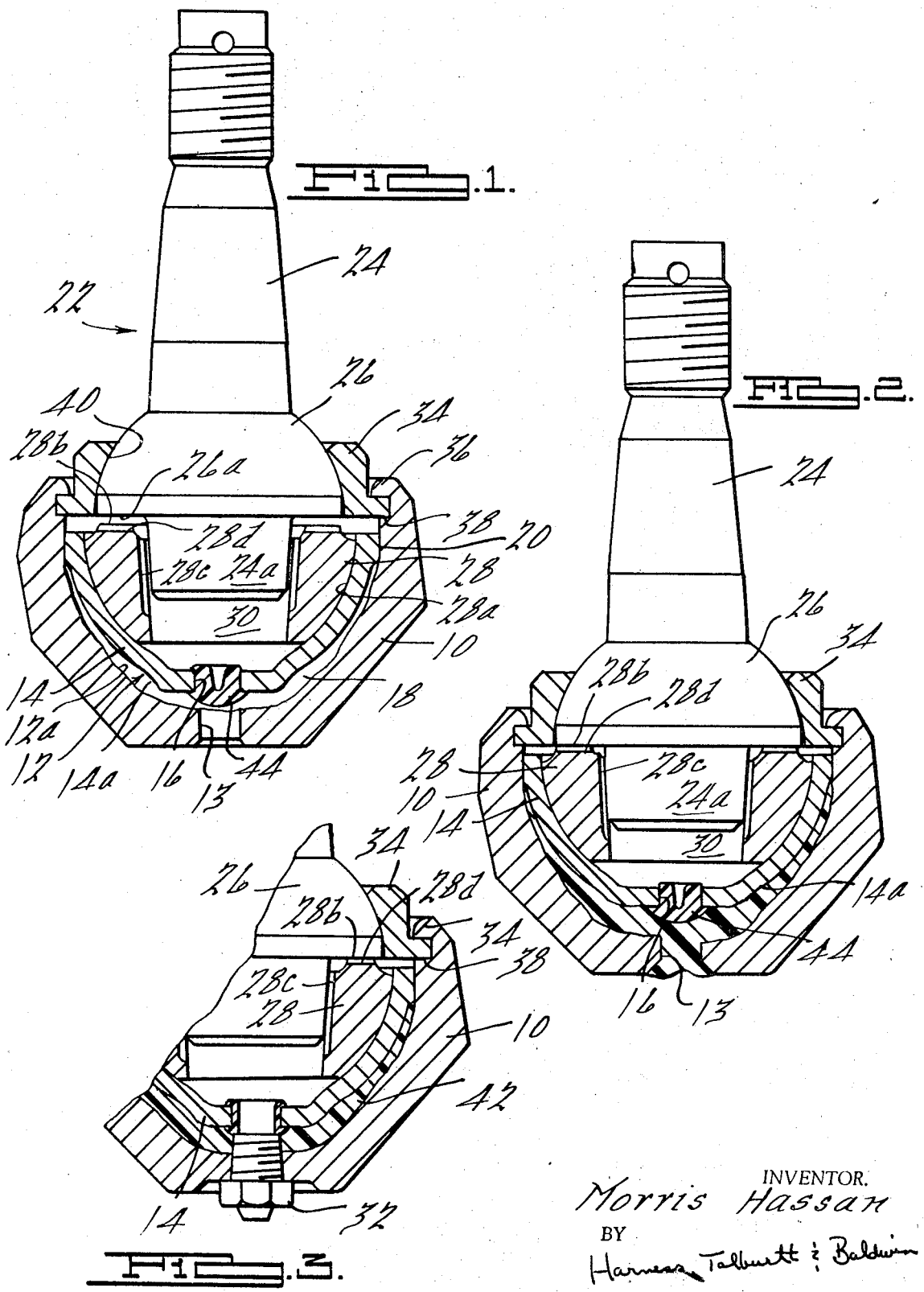

PRELOADED BALL JOINT

BACKGROUND OF THE INVENTION

This invention relates to mechanical joints and more particularly to those of a character known as ball joints. Such joints are well known and find use, for example, in drag link, control arm, and the rod connections of automotive vehicles.

Generally, ball joints are now provided with one or more springs which serve to preload the joint thereby keeping the ball portion of the joint in contact with the socket portion so as to avoid loose fit or "play" from developing in the joint as a result of service wear. Such "play" results in a most immediate and serious problem. Thus, when an automobile is safety inspected it is conventional for the vehicle to be placed upon a hoist such that its wheels do not convey the vehicle weight. Accordingly, at this time, certain of the ball joints of the vehicle are subjected to axial forces which tend to unseat the ball portion of the joint from the socket. If the joint compensating springs do not adequately load the joint, it then sounds loose to the person making the inspection which frequently means that the joint will be though to be worn and requiring replacement when in fact such is not the case.

Unfortunately, thus far, the provision of such preloading means has resulted in a ball joint which is larger in size than desirable or which is costly to manufacture. As ball joints are frequently employed in locations where available space is at a minimum, there have been attempts to overcome the joint size problem by merely reducing the dimensions of the preload springs. This approach has not been successful. Other efforts to provide preload but avoid the aforementioned problems have given rise to joints wherein rubber or plastic has been used between bearing parts or wherein one of the female bearing components of the joint has been fabricated from a resilient plastic material. Again, this approach has not been entirely satisfactory since the plastic material is in a position where it is subjected to high wear resulting in looseness and loss of preload.

SUMMARY OF THE INVENTION

From the foregoing, it will be recognized that a ball joint is needed which is preloaded by a means which does not increase the size of the joint and which does not substantially increase the cost of the joint. Moreover, a preloading means is required which is not subject to wear.

Accordingly, it is an object of this invention to provide an improved ball joint construction.

A further object of the invention is to provide a method of preloading and assembling ball joints which will provide a tight fit as between components and which is easy, quick and economical.

Other objects and advantages of the present invention will become apparent from a further reading of the description, appended claims and accompanying drawing.

According to the present invention, a ball and socket joint is provided which is composed of cooperating housing and stud members. The housing member has an open ended chamber and a cup-shaped bearing insert or liner is loosely disposed in the chamber. The stud member is provided with a generally rounded head portion which is rotatably journaled in the bearing liner, and a cap which overlies the stud head is secured to the open end of the chamber. In order to maintain a substantially uniform or constant bearing pressure between the stud head portion and the supporting bearing, a plastic filler material is injected under substantial pressure into the housing member between the bearing liner and housing chamber. The injected plastic forces the bearing liner upward and firmly presses the bearing components together. When the plastic solidifies, its normal shrinkage will cancel any high preload effect from the injection pressure. Moreover, as the plastic is fully contained there is no danger of cold-flow even if relatively soft fill plastics are used. Any looseness that may develop is the joint will be clearances caused from the measurable actual wear of the internal components.

From the foregoing it is apparent that the arrangement of this invention offers many advantages and overcomes the problems set forth above. Thus, as the plastic filler is encapsulated in a cavity defined by the walls of the bearing liner and housing chamber proper design of these components will provide for a relatively small cavity and only a small amount of plastic will be needed to provide the necessary pressure to seat the joint components. Accordingly, the plastic filler will not increase the size of the joint. Another major advantage is that the walls of the housing chamber and the outer peripheral surface of the bearing liner need not be machined as the bearing liner is not in contact with the housing chamber. Yet another major advantage is that the plastic filler is isolated within a cavity and is not subjected to wear through contact with moving components of the joint. Thus, the desired degree of preload can be maintained for an extended period, providing greater joint life.

DESCRIPTION OF THE DRAWINGS

In the accompanying drawing, in which one of the various possible embodiments is illustrated, FIG. 1 is a sectional elevational view of a compression type ball joint showing the arrangement of components prior to preloading by injection of a plastic filler;

FIG. 2 is a view similar to FIG. 1 showing a joint preloaded by means of a plastic filler; and FIG. 3 is a partial sectional view of the joint shown in FIG. 2 further provided with a grease passage and fitting.

Like parts are indicated by corresponding reference characters throughout the several views of the drawing.

DESCRIPTION OF THE PREFERRED EMBODIMENT

Referring now to FIG. 1 of the drawing, a compression type ball joint is illustrated which comprises a housing 10 which can be an integral portion of a tie rod or the like (not shown). The housing 10 is provided with a chamber 12 and a grease passage 13 communicating with the chamber. A thin-walled sleeve or bearing liner 14 which is open at its top and which, optionally, may be provided with a bottom opening 16 is contained in chamber 12. It will be noted that the bearing liner 14 is loosely disposed in chamber 12, and that the outer peripheral surface 14a of the bearing liner 14 and the adjacent peripheral surface 12a of chamber 12 are generally spaced from each other and cooperate to form a cavity 18. Accordingly, it will be appreciated that neither of these surfaces 12a, 14a need to be machined thereby providing substantial cost savings. To assist in locating the bearing liner 14 in chamber 12, an upper rim portion 20 on each of the liner and chamber can be machined to provide cooperating locating surfaces.

A stud, generally indicated by numeral 22, has a shank 24 is provided with a ball-like head portion which is rotatably journaled within chamber 12. To facilitate better lubricant distribution, the ball-like head portion is composed of two component parts each having a curvilinear surface of different radius. The upper, generally spherical or rounded head portion 26 is an integral part of the stud 22 and extends radially outward from the shank 24 near an end portion 24a thereof. The lower portion of the ball-like head is a generally hemispherical or truncated ball-like member 28 which is disposed in chamber 12 so that its curvilinear sidewall 28a is in slidable engagement with bearing liner 14. Member 28 is provided with an opening 30 extending through the member which receives the lower shank portion 24a of stud 22 such that the generally planar surface 26a of head portion 26 seats against the surface 28b of member 28.

As mentioned above, this particular ball head construction provides for good lubricant distribution since lubricant contained in chamber 12 beneath hemispherical member 28 can travel through opening 30 and a plurality of recesses or grooves 28c, 28d, which are formed respectively, the wall defining opening 30 and in surface 28b of member 28. Lubricant can be supplied to chamber 12 through a grease fitting 32 acting in cooperation with opening 13 as illustrated in FIG. 3. It will be understood of course that for purposes of this invention, the ball head can be of single piece construction and need only have a generally round peripheral surface as opposed to being perfectly spherical.

A cap 34 is secured to housing 10 by means of housing lip 36 which is pressed into engagement with the cap and secures it against housing shoulder 38. The cap is provided with an arcuate surface 40 which overlies and is engageable relationship with the spherical stud head portion 26.

Preload means for maintaining a substantially uniform or constant bearing pressure between the ball-like head portion of stud 22 and bearing liner 14, thereby restraining movement of the stud with respect to the housing 10, is provided which comprises a packing 42. As seen with reference to FIGS. 2 and 3, packing 42 is encapsulated within cavity 18 and provides pressure over essentially all of the bearing liner 14.

In assembling the ball joint, a plastic, hollow core plug or seal 44 is snapped into opening 16 of bearing liner 14 and the bearing liner 14 is placed into chamber 12. In practice, the chamber has been left unmachined and the bearing liner 14 will be a free fit, having a clearance of 0.002 to 0.020 inch relative to the chamber bore. Hemispherical member 28 is then disposed in bearing liner 14, shank 24 journaled in opening 30 of member 28 and cap 34 spin-crimped into place. At this stage, the components of the joint are in the position illustrated in FIG. 1. A plastic material 42 is then injected through opening 13 of housing 10 and into the cavity 18. The plastic, which is injected at a pressure of many hundreds of pounds, forces the bearing liner 14 upwards and stacks all the ball joint components against the cap 34, as seen in FIG. 2.

The packing 42 is preferably a thermosetting or thermoplastic material such as a thermosetting epoxy, melamine, phenolic or polyester resin which may or may not be reinforced with a powdered metal or other toughener ingredient. More preferably because of low cost and adaptability to injection molding are thermoplastic materials such as polyethylene, polypropylene, nylon, acrylonitrile-butadiene-styrene terpolymers and vinyl. It will be appreciated that the plastic filler is not engaged with joint components which move and hence there is no need for the plastic to function as a lubricant. As seen in FIGS. 2 and 3, the packing 42 is in supporting engagement with essentially the entire surface 14a of bearing liner 14 and, accordingly, even pressure distribution is provided across the joint components. It will be noted from a comparison of FIGS. 1 and 2 that the volume of cavity 18 increases somewhat as the plastic is injected into the cavity due to upward movement of bearing liner 14. However, as the spacing between the walls of the cavity decreases towards the top of the chamber the injected plastic will quickly chill in this area and prevent blowby of the rim portions 20. Upon solidification of the plastic in cavity 18, the packing 42 and the seal 44 are drilled through opening 13 and a grease fitting 32 inserted.

From the foregoing, it is believed apparent that the objects of this invention have been obtained, and it will be understood that modification and variations may be made effective without departing from the scope of the novel concepts of the present invention as defined in the appended claims.

I claim:

1. A ball joint comprising a cup-shaped housing having an open ended chamber, a cup-shaped bearing liner slidably seated within said chamber on its outer periphery about the open end of the cup and thereafter diverging away from the wall of said chamber so as to form a cavity between said liner and said chamber, a stud having a shank and a spherical head portion adjacent one end, said spherical head portion being journaled on said bearing liner, a cap secured to said housing adjacent said open end of said chamber and overlying at least a part of said stud head portion, and a packing for restraining said stud head portion from movement with respect to said housing, said packing comprising a solidified filler injected under pressure in said cavity and encapsulated by the surfaces of said bearing liner and chamber to thereby provide pressure distribution over essentially all of said bearing liner and push the bearing liner against said spherical head portion.

2. A ball joint according to claim 1 wherein said filler is selected from the group consisting of thermosetting and thermoplastic materials.

3. A ball joint according to claim 1 wherein said filler is selected from the group consisting of polyethylene, polypropylene, nylon, acrylonitrile-butadiene-styrene terpolymers and vinyl.

4. A ball joint according to claim 1 wherein said stud spherical head portion comprises two components, one of which being a truncated ball-like member having an opening and the other being a segmental spherical head portion formed on the stud shank which is journaled in said opening so as to provide interconnection of said two components.

5. A ball joint according to claim 4 wherein a portion of said truncated ball-like member which is disposed in said housing chamber is spaced from said bearing liner to form a compartment and wherein said bearing liner, packing and housing are provided with cooperating apertures which form a passageway communicating with said compartment.